(12) United States Patent
Schimmer et al.

(10) Patent No.: US 11,946,825 B2
(45) Date of Patent: Apr. 2, 2024

(54) DEVICE FOR MONITORING A SHAFT COUPLING COUPLING A FIRST SHAFT TO A SECOND SHAFT

(71) Applicant: Siemens Aktiengesellschaft, Munich (DE)

(72) Inventors: Jürgen Schimmer, Nuremberg (DE); Christoph Nolting, Höchstadt/Aisch (DE); Dirk Scheibner, Nuremberg (DE); Jürgen Zettner, Veitsbronn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/272,510

(22) PCT Filed: Oct. 29, 2021

(86) PCT No.: PCT/EP2021/080076
§ 371 (c)(1),
(2) Date: Jul. 14, 2023

(87) PCT Pub. No.: WO2022/152422
PCT Pub. Date: Jul. 21, 2022

(65) Prior Publication Data
US 2024/0035926 A1 Feb. 1, 2024

(51) Int. Cl.
*G01M 13/022* (2019.01)
*F16D 9/06* (2006.01)
(Continued)

(52) U.S. Cl.
CPC .............. *G01M 13/022* (2013.01); *F16D 9/06* (2013.01); *F16D 9/08* (2013.01); *F16D 9/10* (2013.01)

(58) Field of Classification Search
CPC .......... G01M 13/022; F16D 9/08; F16D 9/06; F16D 9/10
See application file for complete search history.

(56) References Cited

U.S. PATENT DOCUMENTS

| | | | |
|---|---|---|---|
| 3,935,447 A | 1/1976 | Black et al. | |
| 5,841,132 A * | 11/1998 | Horton | G01D 5/347 341/13 |
| 2019/0145799 A1* | 5/2019 | Guggenmos | G01D 5/3473 250/231.14 |

FOREIGN PATENT DOCUMENTS

| | | |
|---|---|---|
| CN | 110 132 581 A | 8/2019 |
| CN | 111 982 508 A | 11/2020 |

OTHER PUBLICATIONS

PCT International Search Report and Written Opinion of International Searching Authority dated Jan. 4, 2022 corresponding to PCT International Application No. PCT/EP2021/080076 filed Oct. 29, 2021.

* cited by examiner

*Primary Examiner* — Paul M. West
(74) *Attorney, Agent, or Firm* — Henry M. Feiereisen LLC

(57) ABSTRACT

A device for monitoring a shaft coupling coupling a first shaft to a second shaft includes an optical unit having a receiving element to receive electromagnetic radiation. A modifying unit modifies a radiant energy impinging on the receiving element as the first shaft runs asynchronously with respect to the second shaft. The modifying unit includes a holographic optical component designed for arrangement on and/or within the first shaft, and a diaphragm designed for arrangement on and/or within the second shaft and including radially arranged slots and radially arranged filled regions in an at least substantially regular sequence. The diaphragm includes an at least substantially centrally arranged opening. The holographic optical component is designed for illumination or irradiation with the electromagnetic radiation and generates a pattern having radially arranged areas with a first (Continued)

radiant energy and radially arranged areas with a second radiant energy in an at least substantially regular sequence.

20 Claims, 3 Drawing Sheets

(51) Int. Cl.
*F16D 9/08* (2006.01)
*F16D 9/10* (2006.01)

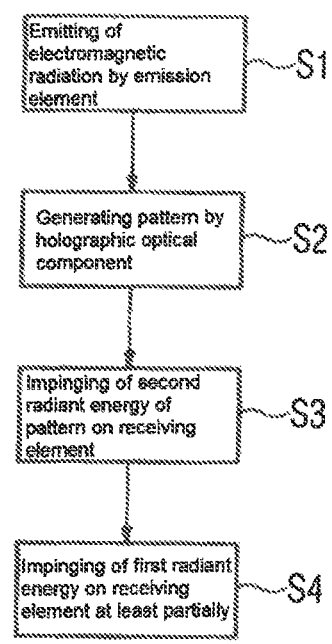

DEVICE FOR MONITORING A SHAFT COUPLING COUPLING A FIRST SHAFT TO A SECOND SHAFT

CROSS-REFERENCES TO RELATED APPLICATIONS

This application is the U.S. National Stage of International Application No. PCT/EP2021/080076, filed Oct. 29, 2021, which designated the United States and has been published as International Publication No. WO 2022/152422 A1 and which claims the priority of European Patent Application, Serial No. 21151798.2, filed Jan. 15, 2021, pursuant to 35 U.S.C. 119(a)-(d).

BACKGROUND OF THE INVENTION

The invention relates to a device for monitoring a shaft coupling coupling a first shaft to a second shaft.

The application in CN 111 982 508 A provides a system and method for monitoring the slip of a shaft coupling and relates to the field of shaft couplings. The slip monitoring system for shaft couplings comprises a shaft coupling, a control unit, at least two signal receive and transmission devices and at least two signal feedback devices, wherein the shaft coupling comprises a first body and a second body; the first body and the second body are arranged opposite one another; the first body and the second body are each equipped with at least one signal feedback device; and the control unit is connected electrically with at least two signal receive and transmission devices. The system and the method for monitoring the slip of the shaft coupling, which are provided by the invention, have the advantages of a simple measuring procedure and a simple detection of the slip angle.

Shaft couplings are critical components in drivetrains, which can be damaged in the case of overload, for instance.

A defective connection between a sensor and a motor is particularly safety-critical, for instance, since a faulty reference signal may exist for a controller and is thus not able to ensure safe operation of the motor. Moreover, with damage of this type, it is no longer possible to adhere to precise speed specifications.

In order to avoid damage to shaft couplings, in most cases individual or all components of the shaft coupling are overdimensioned. This is very cost-intensive, however.

The object underlying the invention is to improve this.

SUMMARY OF THE INVENTION

The object is achieved by a device for monitoring a shaft coupling coupling a first shaft to a second shaft, having:
an optical unit with a receiving element, embodied to receive electromagnetic radiation, in particular light,
a modifying unit, embodied to modify a radiant energy impinging on the receiving element with an asynchronous running of the first shaft with respect to the second shaft
wherein the modifying unit has a holographic optical component, wherein the holographic optical component can be arranged on and/or within the first shaft, wherein the modifying unit has a diaphragm, wherein the diaphragm can be arranged on and/or within the second shaft,
wherein the diaphragm has radially arranged slots and radially arranged filled areas in an at least substantially regular sequence,
wherein the diaphragm has an at least substantially centrally arranged opening,
wherein the holographic optical component can be illuminated/irradiated with electromagnetic, in particular coherent, radiation by means of the emission element,
wherein the holographic optical component generates a pattern, in particular by diffraction and/or refraction and/or reflection and/or interference of the radiation,
wherein the pattern has radially arranged areas with a first radiant energy and radially arranged areas with a second radiant energy in an at least substantially regular sequence.

The invention is suitable for different shaft couplings, e.g. for a shaft coupling which couples a machine shaft to a load, and for a shaft coupling which couples a sensor shaft to a machine shaft.

The invention can be applied in particular for servomotor actuators. Servomotor actuators are designed for work tasks which require high precision. Knowledge about an integrity of a shaft coupling is particularly advantageous herefor.

Electromagnetic radiation in the form of light is particularly suitable. Light is generally understood to mean the visible part of the electromagnetic spectrum in the range of 380 nm to 780 nm. Invisible areas of electromagnetic radiation can also be used for the invention, in particular infrared light or ultraviolet light.

One embodiment is advantageous, according to which the receiving element is embodied as a photodiode.

A photodiode is advantageous since it is inexpensive and robust.

However, it is also possible for the receiving element to be embodied as a diode array, camera or general photodetector. Other forms are also possible.

One embodiment is advantageous, according to which the optical unit has an emission element, embodied to emit a/the electromagnetic radiation, in particular light.

One embodiment is advantageous, according to which the emission element is embodied to emit bundled electromagnetic radiation and/or to emit electromagnetic radiation with a constant wavefront.

One embodiment is advantageous, according to which the emission element is a laser diode.

A laser diode is advantageous, since it is inexpensive and robust.

Other source types can also be used for coherent light.

The modifying unit has a holographic optical component, wherein the holographic optical component can be arranged on and/or within the first shaft.

Holographic optical components are preferably elements, the holographic properties of which are used for an optics of devices. It is possible to replace conventional lenses, mirrors and prisms with holograms. The additional holographic properties are however often particularly advantageous.

Holographic optical components have particular properties, for instance a selectivity of a color and an angle of incidence of light.

Holographic optical components can diffract the light, e.g. for a specific angle of incidence, but can be transparent for other angles of incidence. The different diffraction of light, in particular as a function of a wavelength, allows for a split into spectral colors such as with prisms. With the aid of reflection holograms, it is also possible, for instance, to construct planar mirrors, hollow mirrors or convex mirrors which thus reflect light so that the angle of incidence differs from the angle of reflection.

The holographic, optical component is e.g. an embossed film. This is easy to assemble, robust with regards to large accelerations and inexpensive, particularly in large numbers.

Plastic components with direct structuring can also be used as a holographic optical component. Other forms are also possible.

The modifying unit has a diaphragm, wherein the diaphragm can be arranged on and/or within the second shaft.

The diaphragm has radially arranged slots and radially arranged filled areas in an at least substantially regular sequence.

Other shapes are also possible, however, for instance shapes which generate a continuous intensity variation (e.g. a circumferential sine curve). Other forms are also possible.

The diaphragm has an at least substantially centrally arranged opening.

This is used for lighting.

The holographic optical component can be illuminated/irradiated with electromagnetic, in particular coherent, radiation by means of the emission element, wherein the holographic optical component generates a pattern, in particular by diffraction and/or refraction and/or reflection and/or interference of the radiation, wherein the pattern has radially arranged areas with a first radiant energy and radially arranged areas with a second radiant energy in an at least substantially regular sequence.

This can be e.g. a pattern with light and dark areas.

One embodiment is advantageous, according to which the areas with the first radiant energy can be shielded and/or shaded by the filled areas of the diaphragm.

One embodiment is advantageous, according to which the holographic optical component and the diaphragm are arranged so that with a synchronous running of the first shaft with respect to the second shaft, the second radiant energy impinges on the receiving element.

One embodiment is advantageous, according to which the holographic optical component and the diaphragm are arranged so that with an asynchronous running of the first shaft with respect to the second shaft, the first radiant energy impinges on the receiving element at least partially.

An asynchronous running, in particular an asynchronous running which not only lasts for a short period of time, is in most cases an indication of a fault. Damage to the shaft coupling can be identified as a result.

The invention is advantageous in that a cost-intensive overdimensioning of in particular sensor coupling, sensor shaft and sensor bearing is no longer required.

By means of the invention it is possible to identify couplings damaged or destroyed as a result of overload, for instance.

The invention is particularly suitable for servomotor actuators. Servomotor actuators often have sensors with integral bearings. In this regard the sensor shaft is connected to the machine shaft by way of a coupling. In the case of bearing damage to the sensor bearings, these become sluggish and the sensor coupling is more heavily loaded. This may result in destruction. However, the invention offers the advantage that this can be identified.

The object presented above is further achieved by a shaft coupling, having a device of this type.

The object presented above is further achieved by a dynamoelectric rotary machine having: a first shaft and a second shaft, wherein the first shaft and the second shaft are coupled by means of a shaft coupling; and a device of this type.

One embodiment is advantageous, according to which the first shaft and/or the second shaft is embodied as a hollow shaft.

BRIEF DESCRIPTION OF THE DRAWINGS

The invention is described and explained in greater detail below on the basis of the exemplary embodiments represented in the figures. In the drawings:

FIG. 4 shows a method.

DETAILED DESCRIPTION OF PREFERRED EMBODIMENTS

Figure 1:
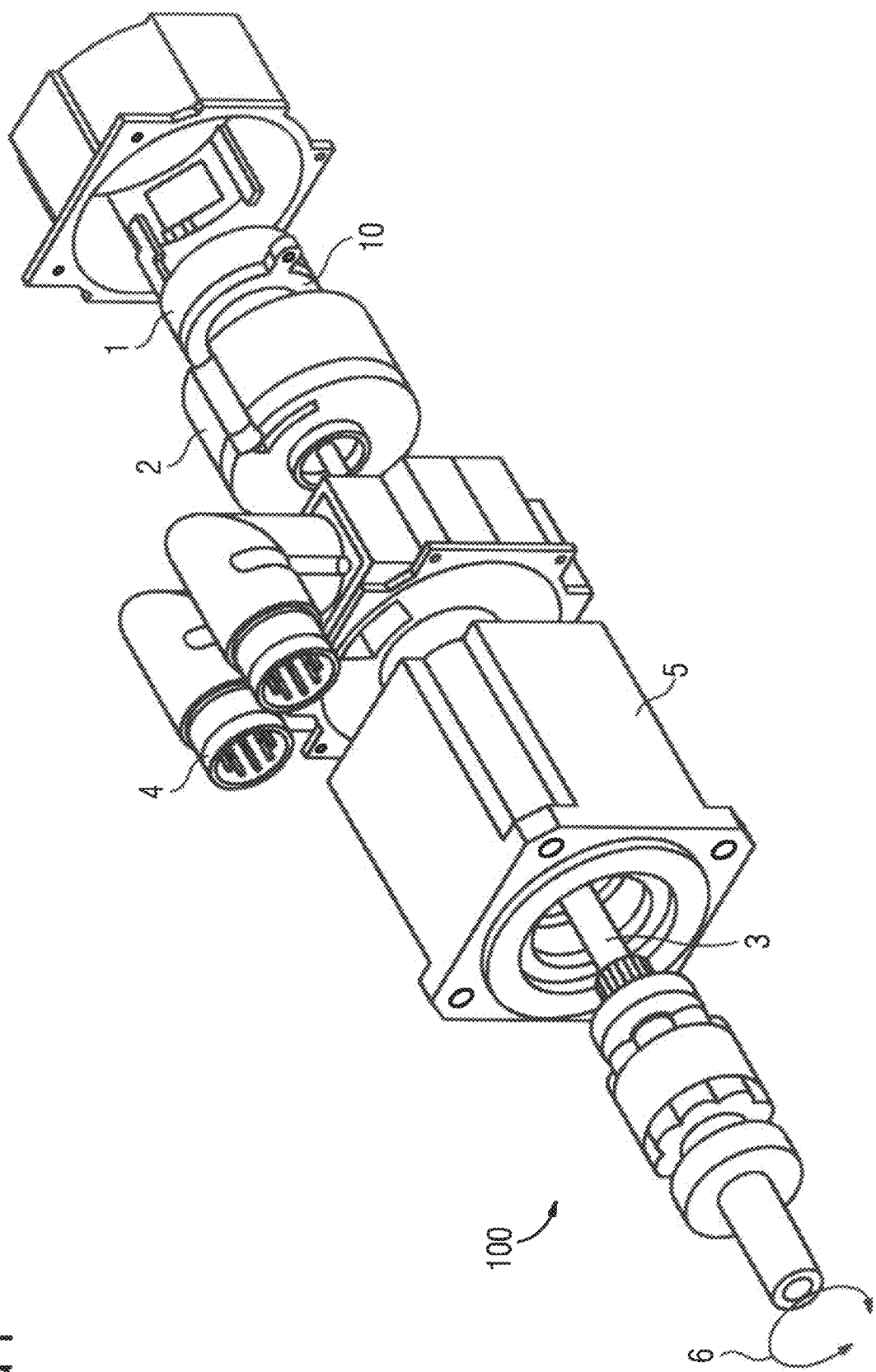
FIG. 1 shows an exploded view of an exemplary servomotor actuator.

FIG. 1 shows an exploded view of an exemplary servomotor actuator 100. The servomotor actuator has a sensor 1, a brake 2, a shaft 3, a connecting device 4 and an active part 5.

FIG. 1 further shows a rotation direction 6.

FIG. 1 also shows a device 10 for monitoring a shaft coupling coupling a first shaft to a second shaft. The device 10 is described in more detail in the following figures. The device 10 can be used to monitor a shaft coupling, which couples a sensor shaft to a machine shaft 3 (as shown in FIG. 1). Furthermore, it is conceivable for the device 10 to be arranged to monitor a coupling of the machine shaft to a load. The device 10 is also suitable for other shaft couplings.

Figure 2:
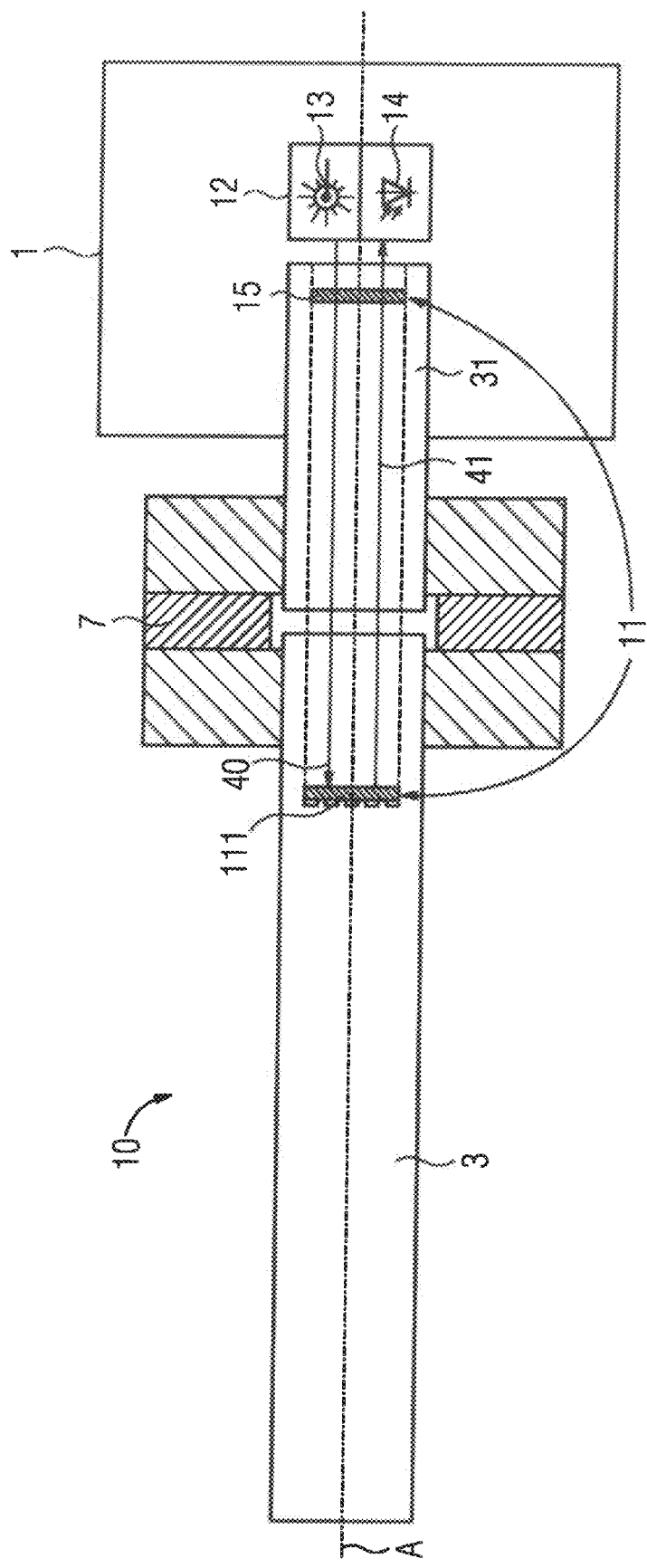
FIG. 2 shows a possible embodiment of the device 10 for monitoring a shaft coupling coupling a first shaft to a second shaft.

FIG. 2 shows a possible embodiment of the device 10 for monitoring a shaft coupling coupling a first shaft to a second shaft.

FIG. 2, the first shaft is a machine shaft 3. In the figure, the second shaft is a sensor shaft 31. FIG. 2 moreover shows that the machine shaft 3 and the sensor shaft 31 are coupled by means of a coupling 7 (also: shaft coupling).

FIG. 2 additionally shows an axis of rotation A.

The device 10 comprises an optical unit 12 with a receiving element, embodiment for receiving an electromagnetic radiation, in particular light. In FIG. 2, this is a photodiode 14. Other receiving elements are also conceivable.

FIG. 2 further shows that the optical nit 12 has an emission element, embodied the emit the electromagnetic radiation, in particular light. The emission element is advantageously embodied to emit bundled electromagnetic radiation and/or to emit electromagnetic radiation with a constant wavefront. The emmission of the radiation is identified with the arrow 40.

In FIG. 2, this is a laser diode 13, Other emission elements are also conceivable.

In FIG. 2, the optical unit 12 is arranged in or on the sensor 1.

The device 10 moreover comprises, a modifying unit 11, embodied to modify radiant energy impinging on the receiving element with an asynchronous running of the first shaft, in FIG. 2 the machine shaft 3, with respect to the second shaft, in FIG. 2 the sensor shaft 31.

The modifying unit 11 advantageously has a holographic optical component 111, wherein the holographic optical component 111 can be arranged on and/or within the first shaft. In FIG. 2, the holographic optical component is arranged within the machine shaft 3. To this end the machine shaft 3 is preferably embodied as a hollow shaft.

The holographic optical component 111 is an embossed film, for instance.

In FIG. 2, the modifying unit 11 has a diaphragm 15, wherein the diaphragm can be arranged on and/or within the second shaft. In the figure, the diaphragm 15 is arranged within the sensor shaft 31. To this end the sensor shaft 31 is preferably embodied as a hollow shaft.

Figure 3:
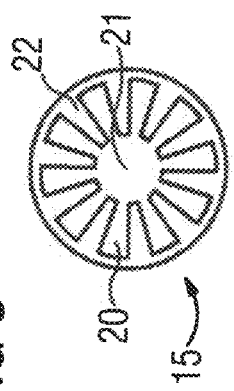
FIG. 3 shows a possible embodiment of a diaphragm.

A possible embodiment of the diaphragm 15 is shown in FIG. 3.

In FIG. 3 the diaphragm 15 has radially arranged slots 20 and radially arranged filled areas 22 in an at least substantially regular sequence.

A centrally arranged, at least substantially circular opening 21, is advantageous, since it can be used for illumination purposes. The diaphragm 15 is designed as a hollow cylinder or as a disk with a central opening.

The holographic optical component can be illuminated and/or irradiated with electromagnetic, in particular coherent, radiation by the emission element (in FIG. 3 the laser diode 13). Arrow 40 shows this.

The holographic optical component 111 advantageously generates a pattern (shown by arrow 41), in particular by diffraction and/or refraction and/or reflection of the radiation.

The pattern advantageously has radially arranged areas with a first radiant energy, in other words e.g. bright areas, and radially arranged areas with a second radiant energy, in other words e.g. dark areas, in an at least substantially regular sequence.

The areas with the first radiant energy can be shielded and/or shaded by the filled areas of the diaphragm 15 shown in FIG. 3.

The holographic optical component 111 and the diaphragm 15 are arranged in FIG. 3 so that with a synchronous running of the machine shaft 3 with respect to the sensor shaft 31, the second radiant energy impinges on the receiving element (photodiode 14).

The holographic optical component 111 and the diaphragm 15 are arranged so that with an asynchronous running of the machine shaft 3 with respect to the sensor shaft 31, the first radiant energy impinges on the photodiode 14 at least partially.

The photodiode 14 thus detects a change in the radiant energy and can transmit this information to a control unit of the servomotor actuator (not shown), for instance.

In other words: A diaphragm 15 is positioned in the sensor shaft 31 embodied as a hollow shaft. This comprises e.g. radial slots with a central opening for an illumination. A reflective hologram, e.g. in the form of an embossed film, is mounted on the shaft end of the machine shaft 3. The hologram advantageously contains a radial light-dark pattern and a lens, so that it generates an image at the site of the diaphragm 15 in the sensor shaft 31. On the sensor side, in FIG. 3 the hologram is illuminated onto the machine shaft with preferably coherent light through the hollow shaft of the sensor 1. The image is designed so that light areas are shaded by the diaphragm in the sensor shaft.

If the two shafts 3 and 31 move in synchrony, this produces a stable image. If the shafts 3 and 31 move relative to one another in the event of a fault, however, the brightness of the image changes. This change is detected with a simple photodiode 14.

A torsion of the machine shaft 3 with a load, in particular with a torque jump, results in a limited change in brightness. If a change occurs beyond this area, a fault in the coupling of the sensor 1 or the coupled sensor shaft 31 is identified.

This principle can be extended with respect to a torque measurement by a more detailed brightness evaluation of the hologram image instead of a simple threshold monitoring.

Here a limited change in brightness is detected quantitatively with a torsion of the shaft by a torque load and converted into a corresponding value of the torque.

A distance of a few centimeters, e.g. 1 cm to 50 cm, is advantageous between the optical unit 12, which is advantageously arranged on the sensor side, and the holographic optical component 111.

In the case of very large machines, it is also possible, however, for a distance to extend over several meters, e.g. 1 to 10 m.

FIG. 4 shows a method.

In a method step S1, the emission element emits electromagnetic radiation, in particular light.

The holographic optical component is therefore irradiated with electromagnetic radiation, in particular with light, by the emission element.

In a method step S2, a pattern is generated by the holographic optical component, wherein the pattern has radially arranged areas with a first radiant energy and radially arranged areas with a second radiant energy in an at least substantially regular sequence.

In a method step S3, with a synchronous running of the first shaft with respect to the second shaft, the second radiant energy impinges on the receiving element, since the areas with the first radiant energy are shielded or shaded by the filled areas of the diaphragm.

In a method step S4, with an asynchronous running of the first shaft with respect to the second shaft, the first radiant energy impinges on the receiving element at least partially. There is no longer any shading on account of the asynchronous running.

The invention claimed is:

1. A device for monitoring a shaft coupling coupling a first shaft to a second shaft, the device comprising:
    an optical unit comprising a receiving element designed to receive an electromagnetic radiation; and
    a modifying unit designed to modify a radiant energy impinging on the receiving element as the first shaft runs asynchronously with respect to the second shaft, said modifying unit comprising a holographic optical component designed for arrangement on and/or within the first shaft, and a diaphragm designed for arrangement on and/or within the second shaft and comprising radially arranged slots and radially arranged filled regions in an at least substantially regular sequence, said diaphragm comprising an at least substantially centrally arranged opening,
    wherein the holographic optical component is designed for illumination or irradiation with the electromagnetic radiation and generates a pattern having radially arranged areas with a first radiant energy and radially arranged areas with a second radiant energy in an at least substantially regular sequence.

2. The device of claim 1, wherein the receiving element is embodied to receive light.

3. The device of claim 1, wherein the electromagnetic radiation is coherent.

4. The device of claim 1, wherein the pattern generated by the holographic optical component is generated by diffraction and/or refraction and/or reflection and/or interference of the electromagnetic radiation.

5. The device of claim 1, wherein the receiving element is a photodiode.

6. The device of claim 1, wherein the optical unit comprises an emission element designed to emit the electromagnetic radiation.

7. The device of claim 6, wherein the emission element is designed to emit bundled electromagnetic radiation and/or to emit electromagnetic radiation with a constant wavefront.

8. The device of claim 6, wherein the emission element is a laser diode.

9. The device of claim 1, wherein the areas with the first radiant energy are capable of being shielded and/or shaded by the filled areas of the diaphragm.

10. The device of claim 1, wherein the holographic optical component and the diaphragm are arranged such that the second radiant energy impinges on the receiving element as the first shaft runs asynchronously with respect to the second shaft.

11. The device of claim 1, wherein the holographic optical component and the diaphragm are arranged such that the first radiant energy impinges on the receiving element at least partially as the first shaft runs asynchronously with respect to the second shaft.

12. A shaft coupling for coupling a first shaft to a second shaft, the shaft coupling comprising a device, said device comprising an optical unit comprising a receiving element designed to receive an electromagnetic radiation, and a modifying unit designed to modify a radiant energy impinging on the receiving element as the first shaft runs asynchronously with respect to the second shaft, said modifying unit comprising a holographic optical component designed for arrangement on and/or within the first shaft, and a diaphragm designed for arrangement on and/or within the second shaft and comprising radially arranged slots and radially arranged filled regions in an at least substantially regular sequence, said diaphragm comprising an at least substantially centrally arranged opening, wherein the holographic optical component is designed for illumination or irradiation with the electromagnetic radiation and generates a pattern having radially arranged areas with a first radiant energy and radially arranged areas with a second radiant energy in an at least substantially regular sequence.

13. The shaft coupling of claim 12, wherein the receiving element is a photodiode.

14. The shaft coupling of claim 12, wherein the optical unit comprises an emission element designed to emit the electromagnetic radiation.

15. The shaft coupling of claim 14, wherein the emission element is a laser diode.

16. The shaft coupling of claim 12, wherein the areas with the first radiant energy are capable of being shielded and/or shaded by the filled areas of the diaphragm.

17. The shaft coupling of claim 12, wherein the holographic optical component and the diaphragm are arranged such that the second radiant energy impinges on the receiving element as the first shaft runs asynchronously with respect to the second shaft.

18. The shaft coupling of claim 12, wherein the holographic optical component and the diaphragm are arranged such that the first radiant energy impinges on the receiving element at least partially as the first shaft runs asynchronously with respect to the second shaft.

19. A dynamoelectric rotary machine, comprising:
a first shaft;
a second shaft;
a shaft coupling designed to couple the first shaft and the second shaft; and
a device for monitoring the shaft coupling, said device comprising an optical unit comprising a receiving element designed to receive an electromagnetic radiation, and a modifying unit designed to modify a radiant energy impinging on the receiving element as the first shaft runs asynchronously with respect to the second shaft, said modifying unit comprising a holographic optical component designed for arrangement on and/or within the first shaft, and a diaphragm designed for arrangement on and/or within the second shaft and comprising radially arranged slots and radially arranged filled regions in an at least substantially regular sequence, said diaphragm comprising an at least substantially centrally arranged opening, wherein the holographic optical component is designed for illumination or irradiation with the electromagnetic radiation and generates a pattern having radially arranged areas with a first radiant energy and radially arranged areas with a second radiant energy in an at least substantially regular sequence.

20. The dynamo-electric rotary machine of claim 19, wherein at least one of the first shaft and the second shaft is a hollow shaft.

* * * * *

UNITED STATES PATENT AND TRADEMARK OFFICE
CERTIFICATE OF CORRECTION

| | | |
|---|---|---|
| PATENT NO. | : 11,946,825 B2 | Page 1 of 1 |
| APPLICATION NO. | : 18/272510 | |
| DATED | : April 2, 2024 | |
| INVENTOR(S) | : Jürgen Schimmer et al. | |

It is certified that error appears in the above-identified patent and that said Letters Patent is hereby corrected as shown below:

On the Title Page

Add:
-- (30) Foreign Application Priority Data
January 15, 2021 (EP) .........................21151798 --

Signed and Sealed this
Twenty-fifth Day of June, 2024

*Katherine Kelly Vidal*

Katherine Kelly Vidal
*Director of the United States Patent and Trademark Office*